(12) United States Patent
Callaway, Jr. et al.

(10) Patent No.: US 6,922,432 B2
(45) Date of Patent: *Jul. 26, 2005

(54) SYSTEM FOR SPREAD SPECTRUM COMMUNICATION

(75) Inventors: Edgar H. Callaway, Jr., Boca Raton, FL (US); Frederick L. Martin, Plantation, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 764 days.

This patent is subject to a terminal disclaimer.

(21) Appl. No.: 09/803,258

(22) Filed: Mar. 9, 2001

(65) Prior Publication Data

US 2002/0126738 A1 Sep. 12, 2002

(51) Int. Cl.$^7$ .................................. H04B 1/69
(52) U.S. Cl. ...................... 375/141; 375/130; 375/140; 375/150; 370/320
(58) Field of Search .................... 370/308, 320, 370/342; 714/755, 774; 375/150, 130, 135, 136, 140, 146, 147, 219

(56) References Cited

U.S. PATENT DOCUMENTS

| 5,748,623 | A | * | 5/1998 | Sawahashi et al. | 370/342 |
| 5,852,630 | A | * | 12/1998 | Langberg et al. | 375/219 |
| 6,108,317 | A | * | 8/2000 | Jones et al. | 370/320 |
| 6,519,275 | B2 | * | 2/2003 | Callaway et al. | 375/140 |
| 6,738,413 | B1 | * | 5/2004 | Karino | 375/130 |

* cited by examiner

*Primary Examiner*—Shuwang Liu
(74) *Attorney, Agent, or Firm*—Kenneth A. Haas

(57) ABSTRACT

A signaling system is provided in which a spread spectrum code is cyclically shifted by a cyclical shift dictated by a bit pattern of one or more bits. The cyclically shifted spread spectrum code is used to modulate a carrier frequency, and transmitted from a transmitter to a receiver. At the receiver the signal including the cyclically shifted spectrum code is demodulated to recover the cyclically shifted code. The cyclical shift is then determined and the bit pattern which is associated with the cyclical shift is output. The method can be used in direct sequence spread spectrum communication.

38 Claims, 9 Drawing Sheets

SYSTEM FOR SPREAD SPECTRUM COMMUNICATION

CROSS REFERENCE TO RELATED APPLICATION

This application is related to the U.S. patent application Ser. No. 09/803,285 Shi, et al., entitled System for Code Division Multi-Access Communication, and U.S. patent application Ser. No. 09/803,259, Lee et al., entitled A Protocol for Self-Organizing Network Using a Logical Spanning Tree Backbone, and U.S. patent application Ser. No. 09/803,322 Shi et al., entitled A Multiple Access Protocol and Structure for Communication Devices in an Asynchronous Network, filed concurrently herewith.

FIELD OF THE INVENTION

This invention pertains to spread spectrum communications. More particularly this invention pertains to a spread spectrum receiver, a spread spectrum transmitter, a spread spectrum communication system and a method of signaling using spread spectrum signals.

BACKGROUND OF THE INVENTION

Currently there is an interest in very low power wireless communication enabled devices. The uses of such devices include asset tracking devices, wireless sensors, wireless actuators for applications including asset tracking systems, wireless sensor networks, industrial and environmental monitoring and control systems, wireless personal computer peripherals, toys, security systems, etc.

With the proliferation of wireless communication services there is paucity of available spectrum. Therefore, system designers have turned to the unregulated Instrument, Scientific, and Medical (ISM) bands of 2.45 Ghz and 900 MHz. However, due to the fact that they are unregulated, the likelihood of a wireless system having to contend with high levels of interference must be taken into account.

One class of wireless communication system that is robust in terms of tolerance of interference is spread spectrum communication. One type of spread spectrum communication is Direct Sequence Spread Spectrum (DSSS) communication. DSSS communication systems are in fact able to contend with Signal to Noise Ratios (SNR) of less than unity.

In conventional DSSS communication systems a binary data signal that is biased so that the two signal states have equal and opposite signal levels is multiplied by a higher frequency signal, thereby spreading its spectrum. The higher frequency signal comprises a series of pulses that are polarized according to the values of a series of elements of a DSSS code. In conventional DSSS communication information is encoded by choosing the polarization of a sequence of pulses corresponding to a DSSS codes, according to the value of a corresponding data bit.

One signaling system uses different codes to communicate different N-bit bit patterns thereby achieving a higher data rate. Unfortunately for a given DSSS code length there are only a limited number of DSSS codes that are sufficiently uncorrelated to be used reliably in the same communication system. If the codes are not sufficiently uncorrelated, the robustness of the system to interference can be degraded due to the need to increase threshold levels used in construing a received symbol.

One possible solution is to use a much longer DSSS code length so that there will be more uncorrelated DSSS codes that can be used for higher order Mary signaling in order to achieve higher signal rates. Unfortunately, the processing of longer DSSS codes increases power consumption and reduces battery life. The latter is unacceptable for low power wireless devices that are intended to be sustained in operation for long periods by a battery.

What is needed is spread spectrum signaling method that can achieve higher data rates without having to use longer DSSS codes, or otherwise increasing power consumption.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENT

Figure 1:
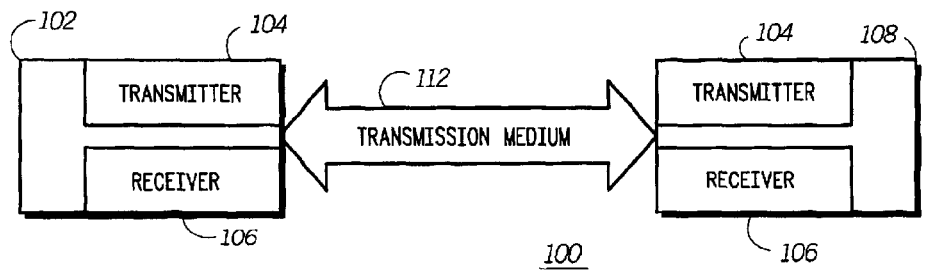
FIG. 1 is a schematic of a communication system according to a preferred embodiment of the present invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

According to preferred embodiments of the present invention, signaling methods, apparatuses, and software are provided for communicating by reading a sequence of N bits, cyclically shifting a spread spectrum code by a number of places that depends on the exact bit pattern of the N bits, modulating a carrier signal with the cyclically shifted spread spectrum code at a transmitter, and preferably with another spread spectrum code that is maintained in a fixed cyclical shift state and thereby serves as a reference, demodulating the signal to obtain a sequence of complex chip values at a receiver, optionally multiplying each Nth complex chip value by another (N+K)th complex chip value displaced from it in the sequence by a fixed number (K) of chip periods to obtain a series of differentially decoded values, correlating the received signal with one or more reference codes to determine a cyclical shift of the cyclically shifted code, and outputting the exact bit pattern. The present invention provides a system that can more efficiently use a single spread spectrum code to represent a greater number of bits, by using different cyclical shift states of the single spread spectrum code to represent different bit patterns. Shorter codes can be used to achieve higher data rates. Shorter codes require less signal processing therefore power consumption is reduced.

FIG. 1 is a schematic of an exemplary communication system 100 used according to a preferred embodiment of the invention.

A first communication apparatus 102 comprises a first transmitter 104, and a first receiver 106.

A second communication apparatus 108 comprises a second transmitter 104, and a second receiver 106.

A transmission medium 112 couples the first communication apparatus, and the second communication apparatus. The transmission medium can comprise free space.

Figure 2:
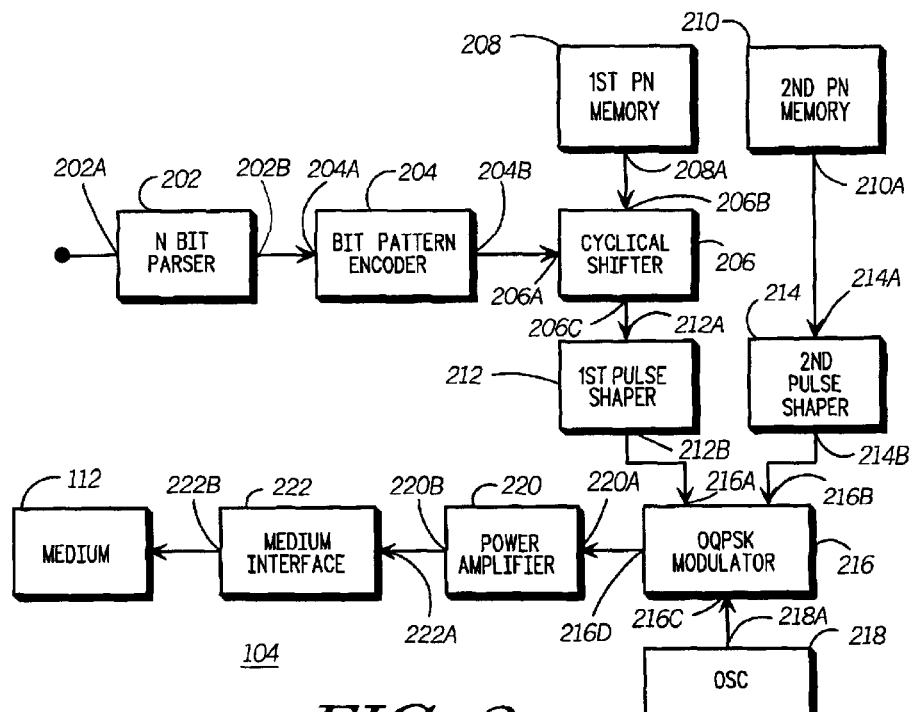
FIG. 2 is a block diagram of a transmitter used in the communication system shown in FIG. 1 according to a preferred embodiment of the invention.

FIG. 2 is a block diagram of a transmitter 104 (FIG. 1) used in the communication system shown in FIG. 1. Binary data input at the binary data input 202A of an N bit parser 202 is parsed into groups of N bits and output at an parser output 202B.

A bit pattern encoder input 204A of a bit pattern encoder 204 is coupled to the parser output 202B. The bit pattern encoder 202 selects a unique cyclical shift (that can be expressed as an integer), based on each possible bit pattern of the N bits, and outputs the cyclical shift at a bit pattern encoder output 204B.

A cyclical shift input 206A of a cyclical shifter 206 is coupled to the bit pattern encoder output 204B for receiving the cyclical shift. A first pseudo noise sequence (PN) memory 208 is used to store a PN code. The PN code preferably comprises a binary sequence. For use in communication the zeros of a PN code can be interpreted as negative ones, e.g., for selecting the polarization of signal depending on an element of a PN code. The PN memory includes a memory output 208A coupled to a PN input 206B of the cyclical shifter 206. The cyclical shifter receives the PN code, cyclically shifts it by a number of places indicated by the cyclical shift received from the bit pattern encoder and outputs a cyclically shifted code at a cyclical shifter output 206C.

A first pulse shaper input 212A, of a pulse shaper 212 is coupled to the cyclical shifter output 206C for receiving, e.g., serially, the cyclically shifted code. The pulse shaper 212 serves to generate a first baseband signal that comprises a sequence of pulses, one for each element of the cyclically shifted code. The rate at which pulses are generated is termed the chip rate. Each pulse covers a chip period. The pulse shape is designed to limit the bandwidth of an RF signal generated by modulating a carrier wave with the baseband signal. For example, the pulse shape can be a half a cycle of a sine function. The polarity of each pulse in the baseband signal depends on the value of a corresponding element of the cyclically shifted code.

A second PN memory 210 includes a second PN memory output 210A that is coupled to a second pulse shaper input 214A of a second pulse shaper 214. The second pulse shaper 214 generates a second baseband signal based on a second PN code stored in the second PN memory 210.

The first pulse shaper 212 includes a first baseband signal output 212B coupled to a first baseband signal input 216A of an Offset Quadrature Phase Shift Key (OQPSK) modulator 216. The second pulse shaper 214 includes a second baseband signal output 214B coupled to a second baseband signal input 216B of the OQPSK modulator 216. An oscillator 218 includes a carrier frequency output 218A coupled to a carrier frequency input 216C of the OQPSK modulator. The OQPSK modulator 216 generates a OQPSK RF signal by mixing a carrier wave received from the oscillator 218 with the first and second baseband signals received from the first 212 and second 214 pulse shapers respectively, and outputs the OQPSK RF signal at an RF output 216D.

An amplifier input 220A of a power amplifier 220 is coupled to the RF output 216D of the OQPSK modulator 216 for receiving the OQPSK RF signal. The amplifier 220 amplifies the OQPSK and outputs an amplified OQPSK RF signal at an amplifier output 220B.

A medium interface input 222A of a medium interface 222 is coupled to the amplifier output 220B. The medium interface 222 comprises an output 222B coupled to the transmission medium 112. The medium can for example comprise free space, in which case the medium interface 222 preferably comprises an antenna.

The first memory 208 and second memory 210 can be implemented as a single physical memory, e.g., a Read Only Memory (ROM).

Figure 3:
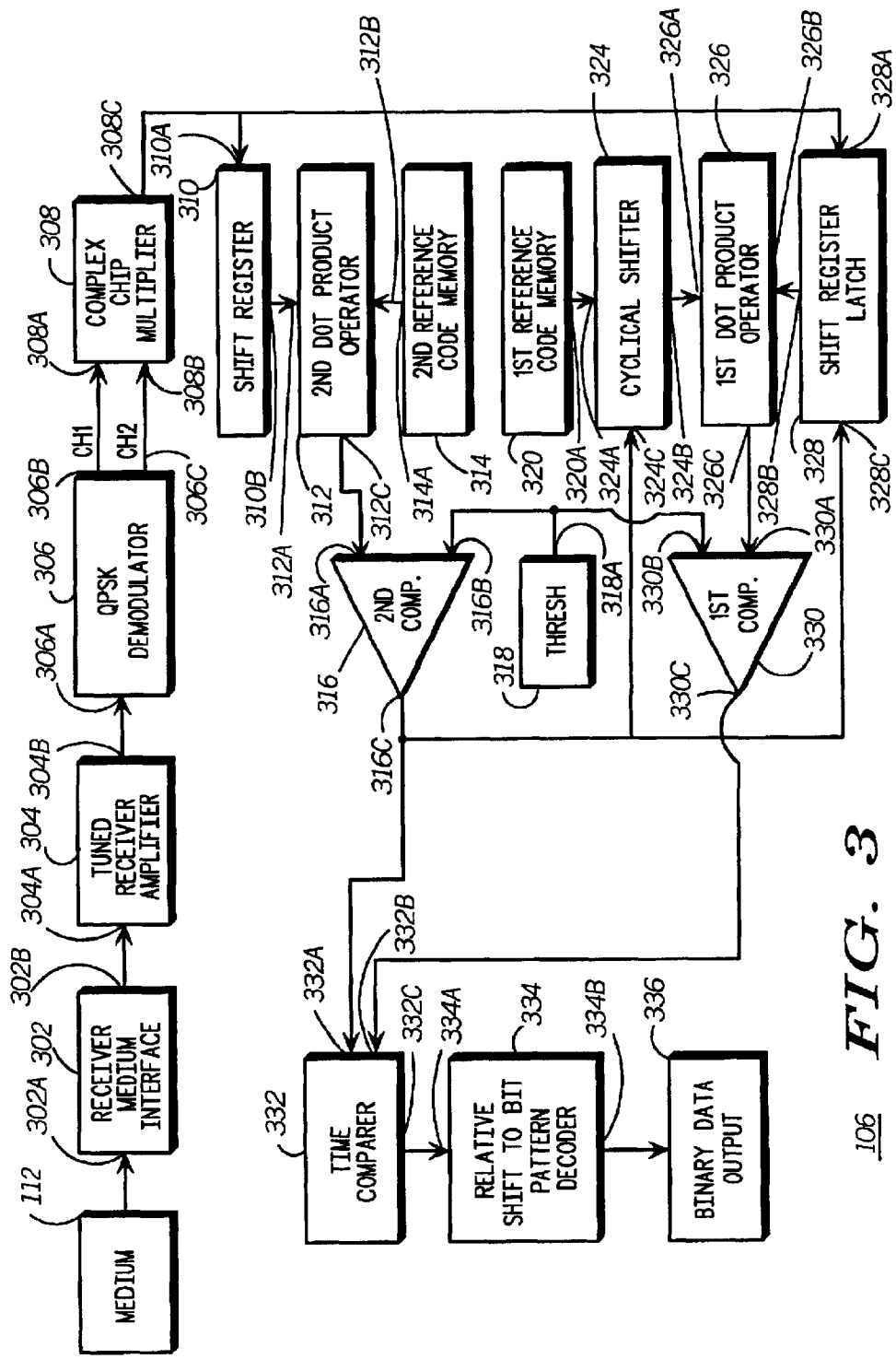
FIG. 3 is a block diagram of a receiver used in the communication system shown in FIG. 1 according to a preferred embodiment of the invention.

FIG. 3 is a block diagram of the receiver 106 used in the communication system shown in FIG. 1 according to a preferred embodiment of the invention.

An input 302A of a receiver medium interface 302 is coupled to the transmission medium 112. In the case that the transmission medium 112 is free space, the receiver medium interface 302 preferably comprises an antenna. The receiver medium interface receives the OQPSK RF signal transmitted by the transmitter 104 (FIG. 2) after it has passed through the transmission medium 112. The OQPSK RF signal is likely to be greatly attenuated after passing through the transmission medium.

A tuned receiver amplifier 304 includes an input 304A that is coupled to an output 302B of the receiver medium interface 302, for receiving the OQPSK RF signal. The tuned receiver amplifier 304 amplifies the OQPSK RF signal and outputs an amplified OQPSK signal at an amplifier output 304B.

A demodulator input 306A of a OPSK demodulator 306 is coupled to the amplifier output 304B for receiving the signal therefrom. The QPSK demodulator 306 demodulates the OQPSK RF signal and outputs a quadrature phase baseband signal at a quadrature phase output 306B, and an in-phase baseband signal at an in-phase output 306C. The QPSK demodulator which is described below in more detail with reference to FIG. 12, preferably comprises a digital second stage, so that the output at the quadrature phase 306B and in-phase 306C outputs comprise sequences of quantized and sampled chip values. Together the two outputs constitute a sequence of complex chip values. The quantized and sampled chip values are output at a rate that is preferably a multiple of the chip rate.

Figure 10:
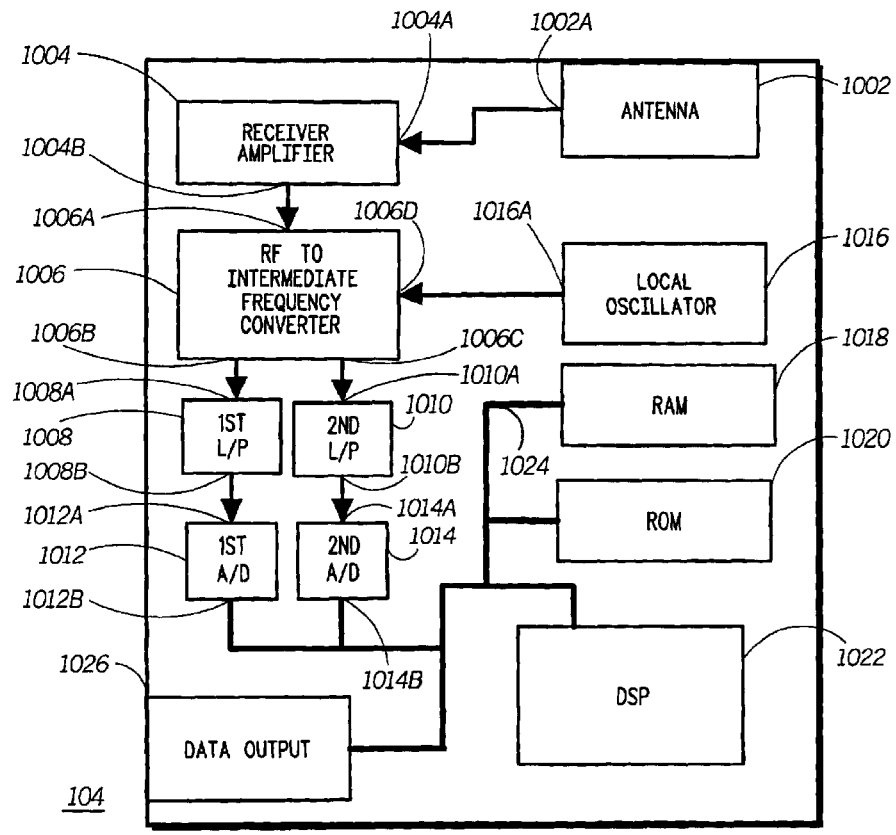
FIG. 10 is a hardware block diagram of the receiver shown in FIG. 2 according to a preferred embodiment of the invention.

A complex chip multiplier 308 includes a first input 308A coupled to the quadrature phase output 306B of the QPSK demodulator 306, and a second input 308B coupled to the in-phase output 306C of the QPSK demodulator 306. The complex chip multiplier multiplies each Nth chip in the series of complex chip values by the complex conjugate of another complex chip value displaced from Nth chip by a fixed number (K) of chip periods, and thereby generates a chip-by-chip differentially decoded (CBCDD) sequence. Preferably the fixed number of chip periods is equal to one so that complex chip values associated with adjacent chips of each baseband signal are involved in each product. For example, an Nth complex element of the CBCDD sequence is obtained by multiplying an (N−1)th complex chip value by the complex conjugate of an Nth complex chip value. Complex chip multiplication serves to reduce an undesirable modulation of the complex chip values caused by frequency drift between the transmitter oscillator 218 and a receiver local oscillator 1016 (FIG. 10). The process and purpose of complex chip multiplication is the subject of a co-pending Application Docket Number CM00333J entitled SYSTEM FOR CODE DIVISION MULTI-ACCESS COMMUNICATION, filed concurrently herewith and hereby incorporated herein by reference.

In connection with the present invention it is noted that when applied to an M-sequence type of PN code, the process of chip multiplication has the effect of shifting the PN code by a number of places or producing a result that is equivalent to taking the negative of the PN code and shifting the result by a certain number of places.

The receiver 106 comprises a first reference code memory 320, a second reference code memory 314, a first dot product operator 326, a second dot product operator 312, a first comparator 330, and a second comparator 316.

The complex chip multiplier 308 includes an output 308C, for outputting the real part of the product obtained by complex chip multiplication. The output 308C of the complex chip multiplier 308 is coupled to a serial input 310A of a shift register 310, and to a serial input 328A of shift register latch 328. A parallel output 310B of the shift register 310B is coupled to a first parallel input 312A of a second dot product operator 312. A second reference code memory 314 includes a parallel output 314A coupled to a second parallel input 312B of the second dot product operator 312.

After each element of the CBCDD series is input into the serial input 310A of the shift register 310 and previously stored CBCDD series elements are shifted, the second dot product operator 312 performs a dot product operation between a sub-series of the CBCDD series that is loaded onto the shift register 310 and a reference code stored in the second reference code memory 314, and outputs a dot product value at a dot product operator output 312C.

A second comparator 316 includes a first input 316A coupled to the second dot product operator output 312C for receiving successive dot product values therefrom. The second comparator 316 further comprises a second input 316B that is coupled to an output 318A of a threshold value source 318. After each dot product value is received by the second comparator 316, the second comparator 316 compares the dot product value to a threshold value received from the threshold value source 318. In the case that a dot product value exceeds the threshold value, the second comparator 316 outputs a first comparator affirmative signal at a first comparator output 316C.

The shift register latch 328 also continually receives the CBCDD series and in response to each new element of the CBCDD stores that new element in a first position of an input register, and shifts other elements of the CBCDD series by one place in the input register. The shift register latch 328 further comprises a control input 328C that is coupled to the output 316C of the first comparator 316. In response to receiving the second comparator affirmative signal from the second comparator, the shift register latch 328 transfers the contents of the input register to a parallel output 328B. The parallel output 328B is coupled to a first parallel input 326B of a first dot product operator 326.

A first reference code memory 320 includes a parallel output 320A coupled to a parallel input 324A of a cyclical shifter 324. The cyclical shifter receives a first reference code from the first reference code memory 320. The cyclical shifter 324 further comprises a parallel output 324B that is coupled to a second parallel input 326A of the first dot product operator 326. The cyclical shifter 324 further comprises a trigger input 324C that is coupled to the second comparator output 316C. In response to the second comparator affirmative signal, the cyclical shifter 324 successively presents the first reference code in a series of cyclically shifted states at a cyclical shifter parallel output 324B. Each successive state has a different cyclical shift, e.g. cyclically shifted by one place relative to a preceding state. In response to receiving each successive cyclically shifted state at its second parallel input 326A, the first dot product operator performs a dot product operation between the first reference code presented in a cyclically shifted state at its second parallel input, and a sub-series of the CBCDD series that has been latched over to the parallel output 328B of the shift register latch 328, and outputs a dot product value at an output 328C. Therefore, the first dot product operator, outputs a succession of dot product values corresponding to a succession of cyclical shift states of the first reference code.

A first comparator 330, includes a first input 330A coupled to output 326C of the first dot product operator 326, and a first input 330B coupled to the output 318A of the threshold value source 318. Rather than using a single threshold value source for the two comparators 316, 330, two separate threshold sources can be used. The first comparator 330 performs comparisons between each dot product value in the succession of dot product values received from the first dot product operator 326 and the threshold value received from the threshold value source 318. In the case that a dot product value exceeds the threshold value, the first comparator 330 outputs a first comparator affirmative signal at a first comparator output 330C.

The second comparator output 316C and the first comparator output 330C are coupled to a first 332A and second 332B inputs of a time comparer 332. The time comparer 332 determines a time difference between a time at which the first comparator affirmative signal is generated by the first comparator 316, and a time at which a second comparator affirmative signal is generated by the second comparator 330. The time difference is linearly dependent on a relative cyclical shift between a first spread spectrum code that is included in the received signal and after differential decoding correlates with the reference code stored in the first reference code memory 314, and second spread spectrum code that is included in the received signal and after differential decoding correlates with the reference code stored in the second reference code memory 320. The time comparer converts the time difference to a relative cyclical shift by applying a linear relation and outputs a signal indicative of a relative cyclical shift between the first spread spectrum code and the second spread spectrum code at a time comparer output 332C.

A relative shift to bit pattern decoder 334 includes a relative cyclical shift input 334A coupled to the time comparer output 332C. The relative shift to bit pattern decoder outputs an information symbol or bit pattern that depends on the relative cyclical shift at an output 334 that is coupled to a binary data output 336.

According to a preferred embodiment of the invention the first reference code memory 314 includes a first reference code generated by operating on the first PN code by multiplying each (Nth) element by another element (N+K)th displaced from the first by a fixed number (K) of places. The second reference code memory 320 includes a second reference code obtained by operating on the second PN code in the same manner.

According to a preferred embodiment of the invention the fixed number used in generating the reference codes stored in the memories 314 320 is equal to the number of chip periods used by the complex chip multiplier. For the purpose of identifying an element displaced from another element of the PN code by the fixed number of places, the PN code can be treated as a circular array.

The comparators 316, 330 compare successive dot product values that correspond to successive symbol length or spread spectrum code length sub-series of the series of complex chip values, to one or more threshold value received from the threshold value source 318, and output signals indicative of the outcome of the comparisons. According to a preferred embodiment of the invention the comparator compares each dot product value to a single threshold value, and if the dot product value exceeds the threshold outputs a signal that is indicative of the fact that a received spread spectrum code has been correctly correlated with a reference code, in other words a correct cyclical shift has been determined.

The first reference code memory 320, cyclical shifter 324, first dot product operator 326, shift register latch 328, and first comparator 330 function as a first correlator. The shift register 310, second dot product operator 312, second reference code memory, and second comparator 316 function as second correlator.

According to an alternative embodiment of the invention multiple versions of a PN code in different cyclical shift states are stored in the first reference code memory 320 and successively read out and applied to the first dot product operator 326.

According to an alternative embodiment of the invention rather than storing PN codes in memory they can be generated using a generator polynomial.

Figure 4:
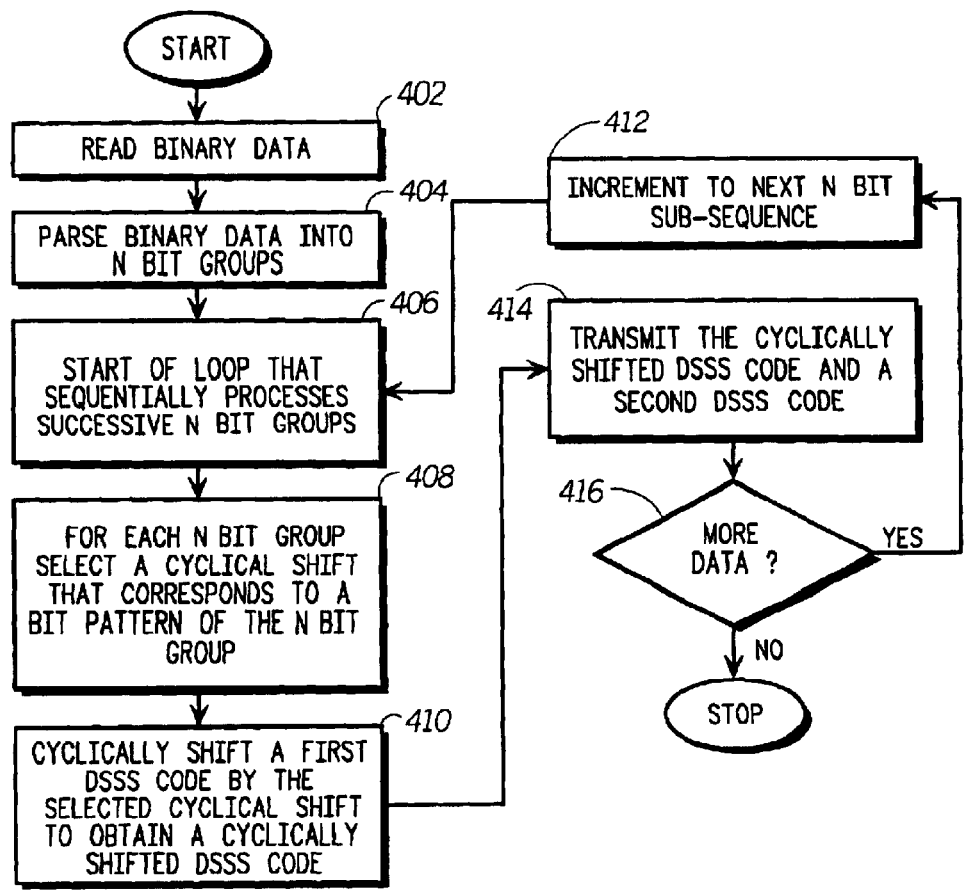
FIG. 4 is a flow chart of a signaling method performed by the transmitter shown in FIG. 2 according to a preferred embodiment of the invention.

FIG. 4 is a flow chart of a signaling method 400 performed by the transmitter 104 shown in FIG. 2 according to a preferred embodiment of the invention. In step 402 binary data is read. In step 404 the binary data is parsed into N bit groups. Process block 406 is the beginning of a loop that sequentially processes successive N bit groups. In step 408 for each N bit group a cyclical shift is selected that corresponds to a bit pattern of the N bit group. In process block 410 a first Direct Sequence Spread Spectrum (DSSS) code is cyclically shifted by the selected cyclical shift to obtain a cyclically shifted DSSS code. A PN code can be used as a DSSS code. In process block 414 the cyclically shifted DSSS code is transmitted along with a second DSSS code. The second DSSS code serves as a reference with respect to which a relative cyclical shift of the first DSSS code is determined. In decision block 416 it is determined if there is more data to be processed. If so then in process block 412, the loop started in process block 406 is incremented to the next N bit group and the process loops back to process block 406. If the outcome of decision block 416 is negative then the process terminates.

The signal generated by the transmitter 104 shown in FIG. 2 according to the method shown in FIG. 4 will be described below with references to FIGS. 5 and 6.

Figure 5:
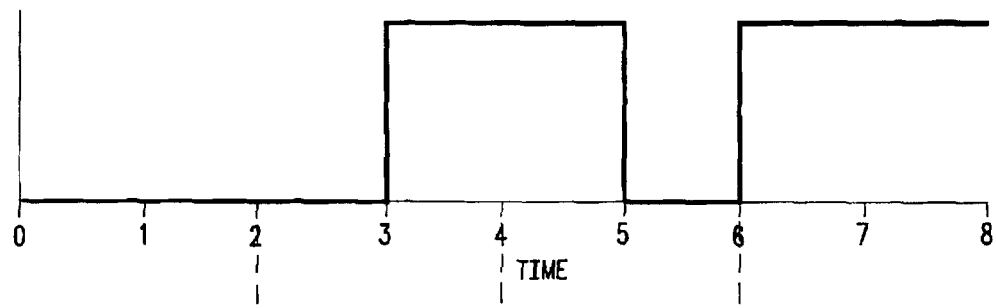
FIG. 5 is a plot of a sequence of 8 bits in signal form.

FIG. 5 is a plot 500 of a sequence of 8 data bits in signal form. Each bit period covers one time unit shown on the abscissa of the plot. The plot shows an eight bits sequence as follows: 0, 0, 0, 1, 1, 0, 1, 1. If the bit parser 202 (FIG. 2) were to parse this sequence into successive groups of two bits the following 2-bit sequences result: 00, 01, 10, 11. Thus in the exemplary signal 500 each of the four possible bit patterns of a two bit sequence is represented. Each bit pattern is an information symbol, and a DSSS code is transmitted in a unique cyclical shift state to convey each bit pattern.

Figure 6:
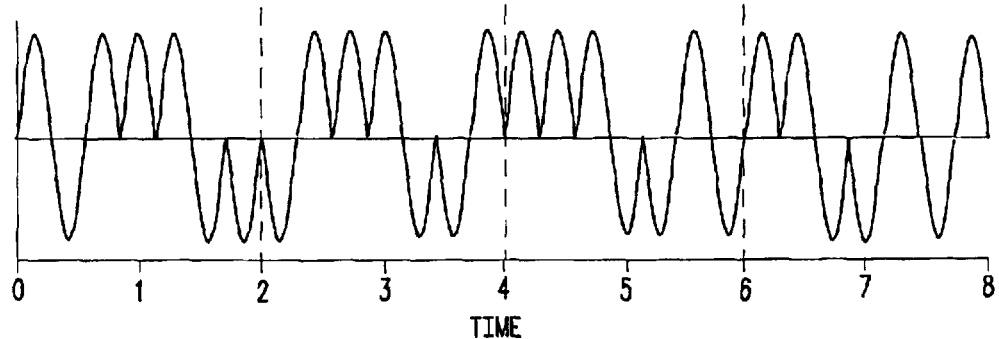
FIG. 6 is a plot of DSSS baseband signal generated by the transmitter shown in FIG. 2 based on the bit sequence shown in FIG. 5.

FIG. 6 is a plot of DSSS baseband signal 600 generated by the pulse shaper 212 in response to the bit signal shown in FIG. 5 according to an exemplary embodiment of the invention. The baseband signal 600 includes four symbol periods i.e., the period covering the ranges of zero to two, two to four, four to six, and six to eight. Each of the four symbol periods which correspond to symbols 00, 01, 10, and 11 respectively, includes a series of pulses based on a DSSS code in a particular cyclical shift state that corresponds to the information symbol for the symbol period.

During each symbol period there is a sequence of pulses equal in number to the number of elements in the DSSS code. Each pulse is polarized according to the sign of the corresponding element of a DSSS code in a cyclical shift state corresponding to the symbol for the symbol period.

A DSSS code in the baseband signal 600 in a first cyclical shift state is [1, −1, 1, 1, 1, −1, −1] is used to encode an information symbol of 00. The series of pulses during the first symbol period is based on the DSSS code in the first cyclical shift state. Cyclically shifting the DSSS code to the left by one place from the previous state yields the DSSS code in a second cyclical shift state which is [−1, 1, 1, 1, −1, −1, 1]. The latter cyclical shift state is used to encode a bit pattern (information symbol) of 01. The series of pulses of the baseband signal 600 during the second symbol period is based on the DSSS signal in the second cyclical shift state. Similarly, as shown in FIGS. 5 and 6 a third cyclical shift state of the DSSS code [1, 1, 1, −1, −1, 1, −1] (shifted by two places to the left from the first cyclical shift state) is used to encode a bit pattern of 10 for the third symbol and a fourth cyclical shift state of the DSSS code [1, 1, −1, −1, 1, −1, 1] (shifted by three places to the left from the first cyclical shift state) is used to encode a bit pattern of 11 for the fourth symbol period.

Thus as illustrated in the forgoing discussion, a single DSSS code can be used to convey two bits of information, by transmitting it in four different cyclical shift states. According to another exemplary embodiment of the invention four bits are conveyed using 16 cyclical shift states of a 63 element PN code.

One type of code used for spread spectrum communication is the maximal length of M-sequence. These codes have lengths of $2^N-1$. In order to encode all the possible bit patterns of an N-bit sequence by using different cyclical shift states $2^N$ cyclical shift states are needed. According to an embodiment of the invention, a zero is appended to an M-sequence in order to obtain a sequence that has $2^N$ possible cyclical shift states and can be used to encode all the possible bit patterns of an N-bit sequence. Thus by appending a zero to a 63 element M-sequence, a 64 element M-sequence is obtained that has 64 distinct cyclical shift states and can be used to encode 6 bits of information.

According to an embodiment of the invention, the second baseband signal output by the second pulse shaper 214 (FIG. 2) includes a periodic signal that is based on a DSSS sequence in a fixed cyclical shift state. In other words the sequence of pulses generated for each symbol period is based on the same cyclical shift state of the same DSSS code. For example, for use in combination with signal 600 which is output by the first pulse shaper 212 according to an exemplary embodiment, a signal which includes a repeating pattern of a sequence of pulses based on a 7 element PN code other than that shown in FIG. 6. At the receiver the 106 the baseband signal output by the second pulse shape 214 is used as a reference relative to which the cyclical shifts of cyclically shifted DSSS codes in the baseband signal 600 output by the first pulse shaper are judged.

Figure 7:
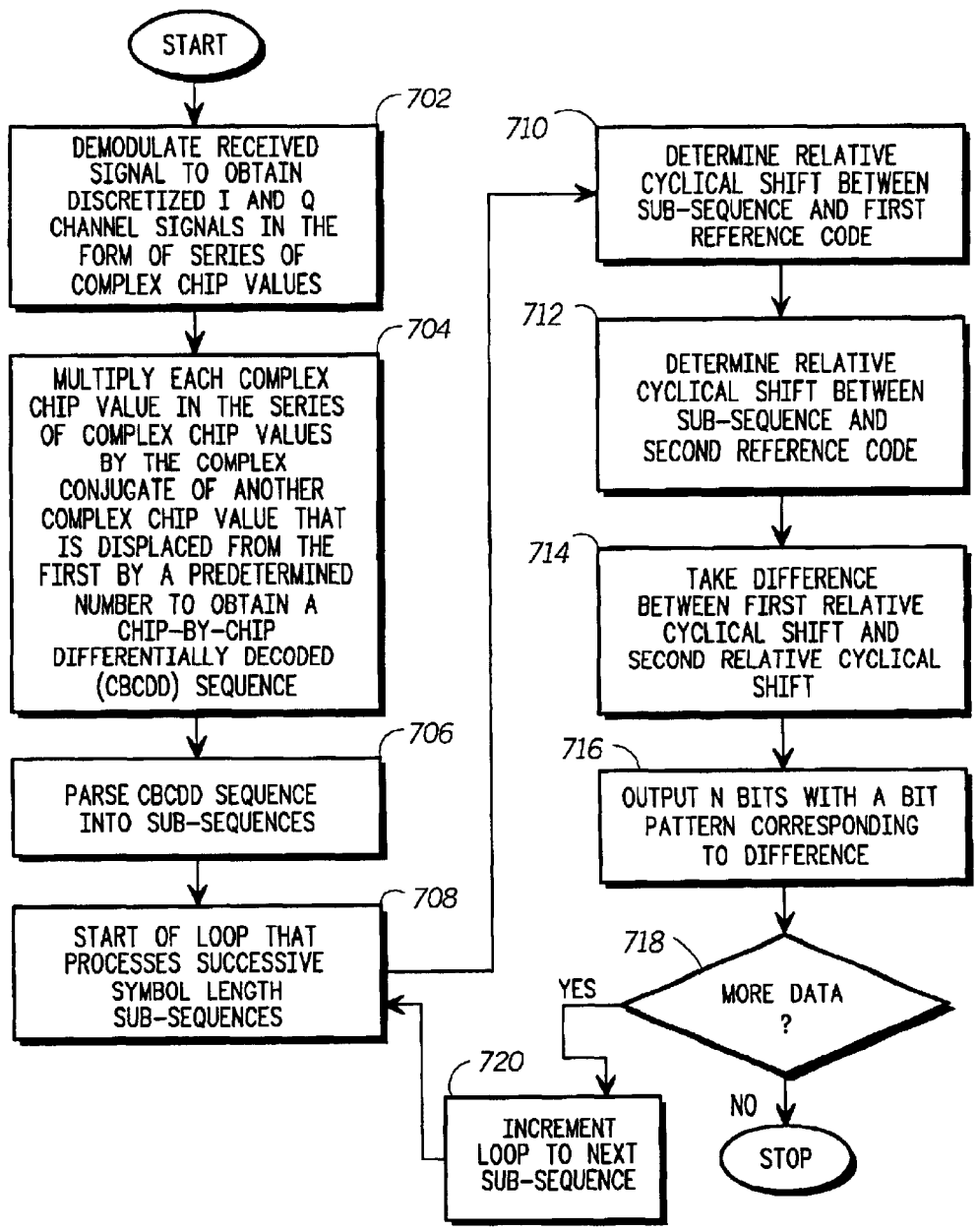
FIG. 7 is a flow chart of a method of processing a received signal that is performed by the receiver shown in FIG. 2 according to a preferred embodiment of the invention.

FIG. 7 is a flow chart of a method of processing a received signal that is performed by the receiver 106 shown in FIG. 1 according to a preferred embodiment of the invention. In step 702 a received signal is demodulated to obtain quantized and sampled in-phase and quadrature phase signals in the form of a series of complex chip values.

In step 704 each (Nth) complex chip value in the series of complex chip values is multiplied by the complex conjugate of another (N+K)th complex chip value that is displaced from the Nth by a fixed number (K, where K is an integer) of chip periods to obtain a chip-by-chip differentially decoded CBCDD sequence. In step 706 the CBCDD sequence is parsed into sub-sequences. According to an alternative embodiment of the invention step 704 is eliminated and sub-series from the series of complex chip values are used in finding relative cyclical shifts of spread spectrum codes included in received signals.

Process block 708 is the start of a loop that processes successive symbol length sub-sequences. In step 710 a relative cyclical shift between a subsequence and a first reference code is determined. In step 712 a relative cyclical shift between the sub-sequence and a second reference code is determined.

In step 714 the difference between the first relative cyclical shift and the second relative cyclical shift is taken.

In step 716 N (an integer number of) bits with a bit pattern corresponding to the difference calculated in process block 714 are output.

In step 718 it is determined if there is more data (sub-sequences) to be processed. If so, then in process block 720 the loop started in process block 708 is increment to consider the next sub-sequence, and then loops back to process block 708.

According to one embodiment of the invention the demodulator 306 oversamples the received signals, and outputs more than one sample, for example four complex samples for each pulse of the first baseband signal. Due to the fact that the first and second baseband signals are superposed, each of these four samples will in general include a term based on the first baseband signal and a term based on the second baseband signal. Given such a sampling rate, the complex chip multiplier 308 would preferably multiply each complex chip value, in the sequence output by the modulator 306 by another that is displaced from it by four places (equal to one chip period). In this example, the resulting CBCDD sequence is parsed into sequences that are four times longer than the spread spectrum codes used to generate the received signals. In this example, each reference code used to correlate the received signals can be obtained by multiplying each Nth element in a spread spectrum code used to generate the signals by an (N+1)th element, and duplicating each element of the differentially decoded spread spectrum code four times. For example treating the code [1, −1, 1, 1, 1, −1, −1] as a circular array and multiplying each element by the next one obtains a differentially decoded code of [−1, −1, 1, 1, −1, 1, −1]. Duplicating each element four times one obtains a reference code of [−1, −1, −1, −1, −1, −1, −1, −1, 1, 1, 1, 1, 1, 1, 1, 1, −1, −1, −1, −1, 1, 1, 1, 1, −1, −1, −1, −1].

Figure 8:
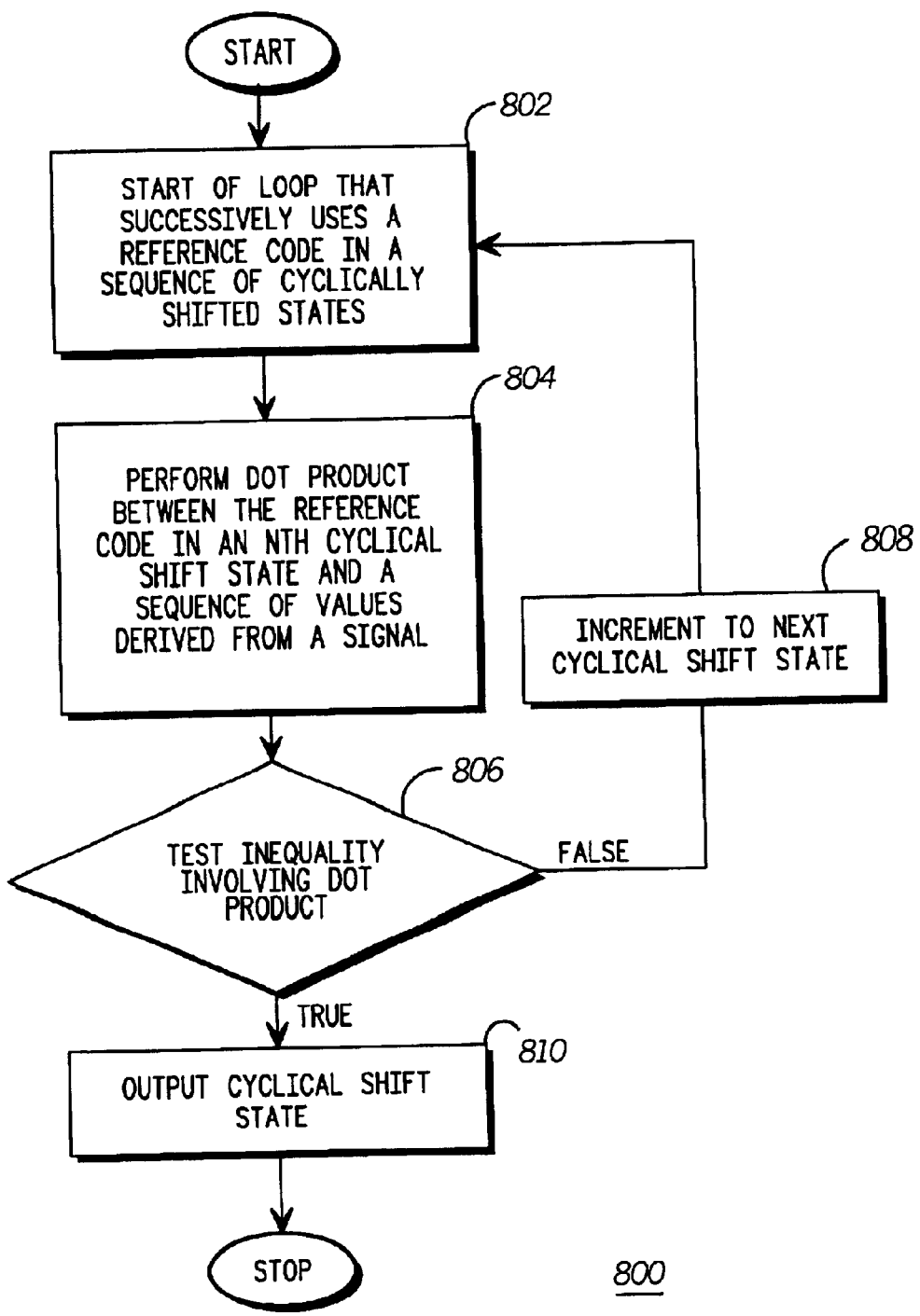
FIG. 8 is a flow chart of a process for determining a relative cyclical shift of a spread spectrum code included in a DSSS signal.

FIG. 8 is a flow chart of a process for determining a relative cyclical shift of a spread spectrum code included in a DSSS signal.

Process block 802 is the start of a loop that successively uses a reference code in a sequence of cyclically shifted states. In step 804 a dot product is performed between the reference code and a sequence of values derived from a received signal. Preferably the values are complex values, more preferably the values are obtained by chip by chip differential decoding of complex values derived from a received signal.

In decision block 806, an inequality involving the dot product value computed in step 804 is tested. If the inequality is true, then in step 810 the current cyclical shift state is output. If not then in process block 808 the cyclical shift state is incremented, and the process loops back to process block 802. In a hardware implementation the inequality relation can be testing using one or more comparators, as discussed above with reference to FIG. 3.

Figure 9:
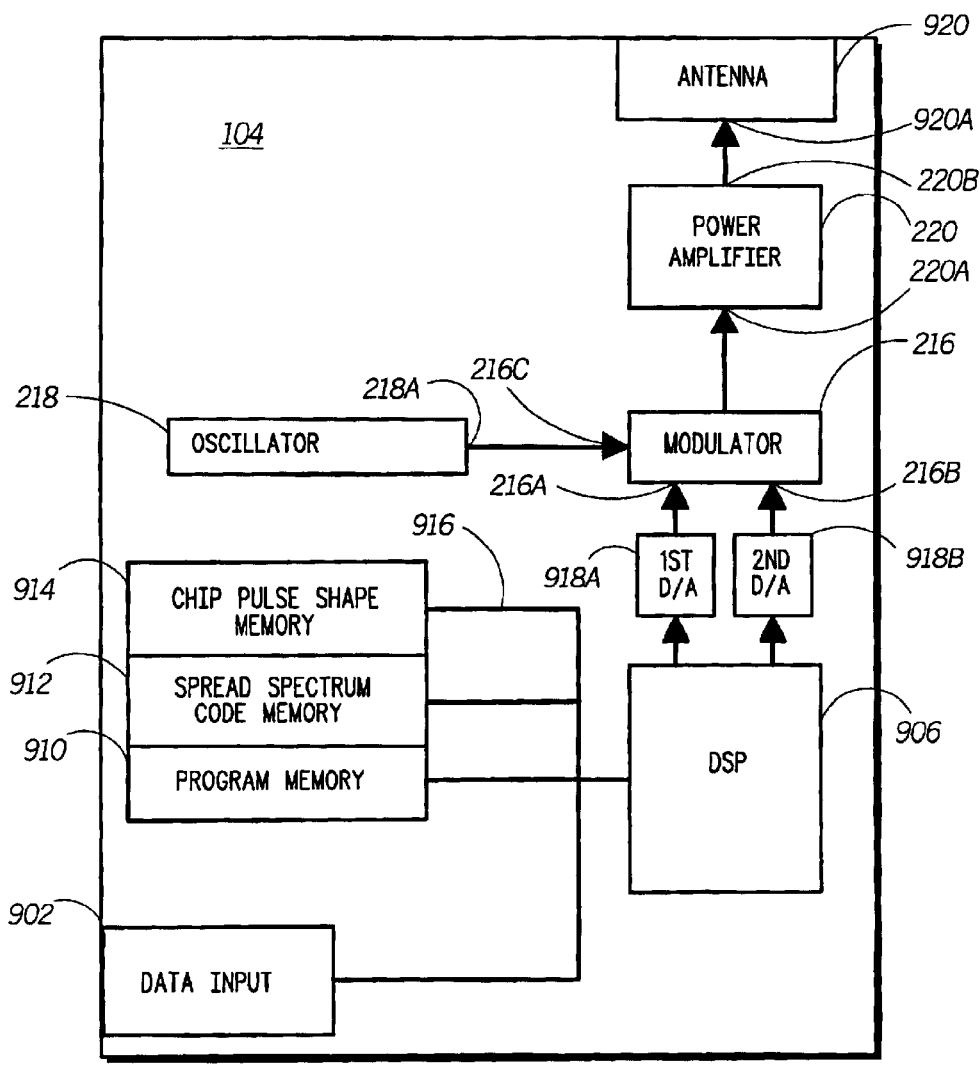
FIG. 9 is a hardware block diagram of the transmitter shown in FIG. 2 according to a preferred embodiment of the invention.

Referring to FIG. 9 an exemplary hardware block diagram of a transmitter 104 is shown.

The transmitter 104 comprises a data input 902 that is coupled to a digital signal bus 916. A program memory 910, spread spectrum code memory 912, and chip pulse shape memory 914 are coupled to a digital signal processor (DSP) 906 through the digital signal bus 916. The three foregoing memories 914, 912, 910 can be implemented, for example, as a single physical memory, e.g., a Programmable Read Only Memory (PROM). The spread spectrum code memory can be used as the first PN memory 208 (FIG. 2) and the second PN memory 210 (FIG. 2).

The program memory 910 is a computer readable medium that stores software for operating the receiver. The spread spectrum code memory 912 stores spread spectrum codes. The chip pulse memory 914 stores a digital representation of the pulse shapes used in generating baseband signals (e.g. 600, FIG. 6).

An output of the digital signal processor 906, is coupled to an input of a first digital to analog converter 918A. The digital signal processor 906 combines the representation of the chip pulse shape, the spread spectrum code, and a binary data sequence into a digital representation of baseband signals. A first digital representation of a baseband signal is used drive a first digital to analog converter 918A. For example the first digital representation of a baseband signal can include a cyclically shift spread spectrum code. A second digital representation of a baseband signal is used to drive a second digital to analog converter 918B. The second digital representation of a baseband signal can for example include periodic repeats of the same spread spectrum code in the same cyclical shift state. The first 918A and second 918B analog to digital converters generate first and second analog baseband signals.

The modulator 208 has a first input 216A coupled to an output of the first digital to analog converter 918A, and receives the first analog baseband signal therefrom. The modulator 208 has a second input 216B coupled to an output of the second digital to analog converter 918B, and receives the analog version of the second baseband signal therefrom. The modulator 216 has a carrier frequency input 216C coupled to an output 218A of the oscillator 218, and receives a carrier frequency signal therefrom. The modulator 216 serves to modulate the carrier frequency signal with the analog versions of the baseband signals, and output a resulting RF signal. Preferably the modulator 216 is OQPSK modulator. Alternatively the modulator can be a QPSK modulator.

The power amplifier 220 comprises an input 220A coupled to an output 216D of modulator 216 for receiving the RF signal.

An antenna 920 comprises an input 920A coupled to the output 220B of the amplifier 220 for receiving the RF signal. The antenna 920 serves to couple the RF signal into free space.

The program memory 910 can be used to store programs the functioning of which is illustrated with reference to FIG. 4. Furthermore, functional blocks shown in FIG. 2 including the N bit parser 202, bit pattern encoder 204, cyclical shifter 206, first pulse shaper 212, and second pulse shaper 214 can be implemented as programs stored in the program memory, and executed by the DSP 906.

FIG. 10 is a hardware block diagram of the receiver 106 according to a preferred embodiment of the invention.

A receiver antenna 1002 includes an output 1002A coupled to an input 1004 of a receiver amplifier 1004. The receiver amplifier 1004 includes an output 1004B coupled to an input 1006A of an RF to intermediate frequency converter 1006. A local oscillator 1016 includes an output 1016A coupled to an oscillator input 1006D of the RF to intermediate frequency converter 1006. The RF to intermediate frequency converter 1006 preferably is an analog stage of a QPSK demodulator (e.g., 306, FIG. 3). The RF to intermediate frequency converter 1006 comprises an in-phase output 1006B that is coupled to an input 1008A of a first low pass filter 1008, and a quadrature phase output 1006C that is coupled to an input 1010A of a second low pass filter 1010. The first low pass filter 1008 includes an output 1008B coupled to an input 1012A of a first digital to analog converter 1012. Likewise, the second low pass filter 1010 includes an output 1010B coupled to an input 1014A of a second analog to digital converter 1014. An output 1012B of the first analog to digital converter 1012, and an output 1014B of the second analog to digital converter 1014 are coupled to a receiver digital signal bus 1024. A receiver digital signal processor (DSP) 1022, Read Only Memory (ROM) 1020, Random Access Memory (RAM) 1018 are also coupled to the receiver digital signal bus 1024. The ROM 1020 can be used to store programs that are executed by the receiver DSP 1022 in operating the receiver 104, including the programs illustrated with reference to FIG. 7 and FIG. 8. The RAM 1018 is used as a works space for running the aforementioned programs. Functional blocks shown in FIG. 3 including the complex chip multiplier 308, first comparator 330, time comparer 332, shift register 310, second dot product operator 312, cyclical shifter 324, first dot product operator 326, shift register latch 328, second comparator 316, and relative shift to bit pattern decoder 334 can be implemented as programs stored ROM and executed by DSP 1022. The threshold 326 can be a value stored in ROM 1020 or RAM 1018. The ROM 1020 can be used as the reference code memory 316.

Figure 11:
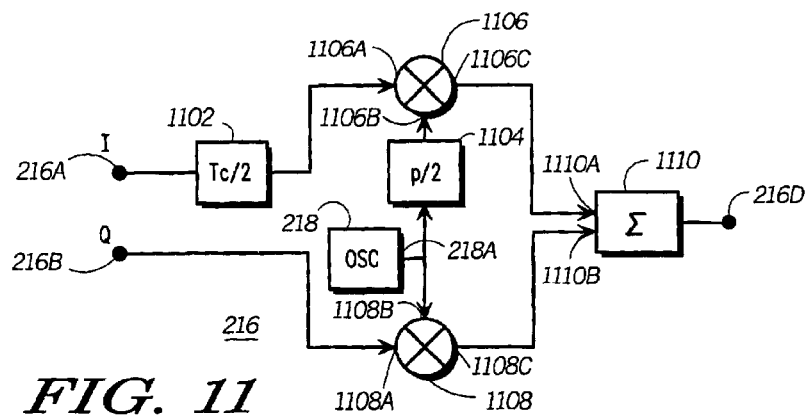
FIG. 11 is a schematic of a OQPSK modulator used in the transmitter shown in FIG. 2 and FIG. 9.

FIG. 11 is a schematic of an OQPSK modulator 216 used in the transmitter shown in FIG. 2 and FIG. 9. The modulator 216 includes the first modulator input 216A that is coupled through one-half chip period delay 1102 to a first first mixer input 1106A of a first mixer 1106. The second modulator input 216B is coupled to a first second mixer input of a second mixer 1108.

The output 218A of the oscillator 218 is coupled to a second second mixer input 1108B of the second mixer 1108, and to an input 1104A of a π/2 phase shifter 1104. An output 1104B of the phase shifter 1104 is coupled to a second second mixer input 1106B. An output 1106C of the first mixer 1106 is coupled to a first input 1110A of a summer 1100. Similarly an output 1108C of the second mixer 1108 is coupled to a second input 1110B of the summer 1110. The output of the summer 216D is the output of the modulator 216.

Figure 12:
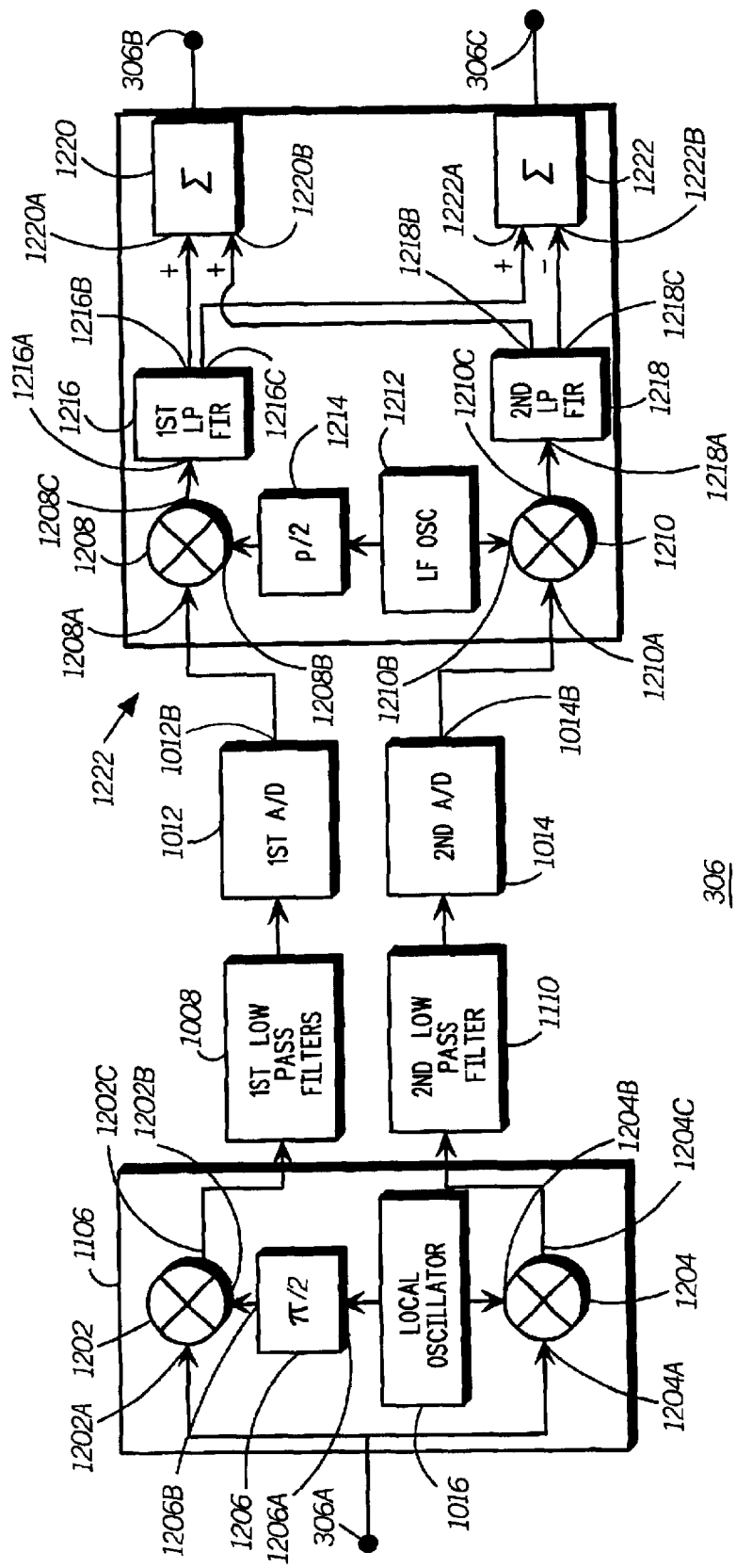
FIG. 12 is a schematic of a demodulator used in the receiver shown in FIG. 3 and FIG. 10.

FIG. 12 is a schematic of the demodulator 306 used in the receiver 104 shown in FIG. 3 and FIG. 10. The demodulator comprises the RF to intermediate frequency converter 1006. The demodulator input 306A is coupled to a first input 1202A of a first mixer 1202, and a second input 1204A of a second mixer 1204. Local oscillator 1016 is coupled to a second input 1204B of the second mixer 1204, and to an input 1206 of a π/2 phase shifter 1206. An output 1206B of the π/2 phase shifter 1206 is coupled to a second input 1202B of the first mixer. An output 1202C of the first mixer 1202 is coupled to the input 1008A of the first low pass filter 1008. An output 1204C of the second mixer 1204 is coupled to the input 1110A of the second low pass filter 1110.

The demodulator 306 comprises a digital stage 1222. The digital stage 1222 of the demodulator 306 can be implemented as a program stored in the ROM 1020 (FIG. 10) and executed by the DSP 1022. The output 1012B of the first analog to digital convert 1012 is coupled to a first input 1208A of a first digital mixer 1208. The output 1014B of the second analog to digital converter 1014 is coupled to a first input 1210A of a second digital mixer 1210. The inputs 1208A, 1210A of the first and second digital mixers 1208, 1210 serve as inputs of the digital stage 1222. A low frequency oscillator 1212 is coupled to a second input 1210B of the second digital mixer 1210, and through a π/2 phase shifter 1214 to a second input 1208B of a the first mixer 1208. An output 1208C of the first digital mixer 1208 is coupled to an input 1216A of a first low pass filter 1216. An output 1210C of the second digital mixer 1210 is coupled to an input 1218A of a second low pass filter 1218.

A first output 1216B of the first low pass filter 1216 is coupled to a first non-inverting input 1220A of a first summer 1220. A second output 1216C of the first low pass filter 1216 is coupled to a non-inverting input 1222A of a second summer 1222. A first output 1218B of the second low pass filter 1218 is coupled to a second non-inverting input 1220B of the first summer 1220. A second output 1218C of the second low pass filter 1218 is coupled to an inverting input 1222B of the second summer 12222. An output of the first summer 1220 serves as the quadrature phase demodulator output 306B. An output of the second summer 1222 serves as the in-phase demodulator output 306C.

The transmitter 104 and the receiver 106 can be implemented in whole or in part as one or more Application Specific Integrated Circuits (ASIC).

The computer readable medium used in connection with the present invention as a memory for storing programs can comprise volatile memory such as RAM, or a medium that contains data in a transient state, such as a communication channel, network circuits, or a wireless communication link, or preferably nonvolatile memory including but not limited to, flash memory, Read Only Memory (ROM), EPROM, EEPROM, disk drive. The computer readable medium used as a work space for signal processing operations, can comprise Random Access Memory (RAM).

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed.

The invention is not limited to any particular computer program or logic or language, or instruction but may be practiced with any such suitable program, logic or language, or instructions as would be known to one of ordinary skill in the art.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method for operating a transmitter to transmit data the method comprising the steps of:
   reading one or more bits to be transmitted
   determining a first cyclical shift based on a bit pattern of the one or more bits;
   obtaining a first direct sequence spread spectrum code characterized by the first cyclical shift; and
   transmitting the first direct sequence spread spectrum code to convey the bit pattern.

2. The method according to claim 1, wherein:
   the step of reading a one or more bits comprises the sub-step of:
   reading N bits; and
   the step of obtaining a first direct sequence spread spectrum code comprises a step of obtaining a $2^N$ element first direct sequence spread spectrum code that includes an M-sequence and one or more appended zeros.

3. The method according to claim 1 wherein the step of obtaining a first direct sequence spread spectrum code characterized by the first cyclical shift state comprises the sub-steps of:
   reading the first direct sequence spread spectrum code in a state characterized by a second cyclical shift; and
   cyclically shifting the first direct sequence spread spectrum code.

4. The method according to claim 1 wherein the step of obtaining a first direct sequence spread spectrum code characterized by a first cyclical shift comprises the sub-step of:
   reading the first direct sequence spread spectrum code from a memory.

5. The method according to claim 1 wherein the step of transmitting the first direct sequence spread spectrum code comprises the sub-step of:
   transmitting the first direct sequence spread spectrum code in a first channel of a phase shift key signal.

6. The method according to claim 1 further comprising the step of:
   transmitting a second direct sequence spread spectrum code.

7. The method according to claim 6 wherein:
   the step of transmitting the first direct sequence spread spectrum code comprises the sub-stop of:
   transmitting the first direct sequence spread spectrum code in a first channel of a quadrature phase shift key signal; and
   the step of transmitting the second direct sequence spread spectrum code comprises the sub-step of:
   transmitting the second direct sequence spread spectrum code in a second channel of the quadrature phase shift key signal.

8. A method for operating a receiver, the method comprising the steps of:
   receiving a signal that includes a first direct sequence spread spectrum code;
   determining a correct relative cyclical shift of the first direct sequence spread spectrum code; and
   outputting one or more bits having a bit pattern associated with the correct relative cyclical shift.

9. The method according to claim 8 wherein the step of determining a correct relative cyclical shift comprises the sub-step of:
   performing a dot product operation between the first direct sequence spread spectrum code and a reference code at a plurality of relative cyclical shifts to obtain a plurality of dot product values.

10. The method according to claim 9 wherein the step of determining a correct relative cyclical shift further comprises the sub-step of:
    testing one or more inequality relations involving each of the plurality of dot product values in order to identify the correct cyclical shift that corresponds to a first dot product value from the plurality of dot product values that passes one or more inequality relations.

11. The method according to claim 8 wherein the step of receiving a comprises the sub-step of:
    receiving a signal that includes the first direct sequence spread spectrum code, and a second direct sequence spread spectrum code.

12. The method according to claim 11 wherein the step of receiving a signal comprises the sub-step of:
    receiving a quadrature phase shift key signal including the first direct sequence spread spectrum code in a first channel, and a second direct sequence spread spectrum code in a second channel.

13. The method according to claim 11 wherein the step of determining a correct relative cyclical shift comprises the sub-step of:
    determining the correct relative cyclical shift of the first direct sequence spread spectrum code relative to the second direct sequence spread spectrum code.

14. The method according to claim 13 wherein the step of determining a correct relative cyclical shift comprises the sub-step of:
    performing a dot product operation between the first direct sequence spread spectrum code and a first reference code at a plurality of relative cyclical shifts to obtain a first plurality of dot product values;
    testing one or wore inequality relations involving each of the first plurality of dot product values in order to identify a first relative cyclical shift which corresponds to a first dot product value from the plurality of dot product values that passes at least one inequality relation among the one or more inequality relations;

performing a dot product operation between the second direct sequence spread spectrum code and a second reference code at a plurality of relative cyclical shifts to obtain a second plurality of dot product values;

testing one or more inequality relations involving each of the second plurality of dot product values in order to identify a second relative cyclical shift which corresponds to a first dot product value from the plurality of dot product values that passes at least one inequality relation among the one or more inequality relations; and subtracting the first relative cyclical shift from the second relative cyclical shift to obtain the correct relative cyclical shift.

15. The method according to claim 8 wherein the step of receiving a signal comprises the sub steps of:

demodulating the signal using a quadrature demodulator; and sampling the signal to obtain a sequence of complex chip values including the first direct sequence spread spectrum code.

16. The method according to claim 15 further comprising the step of:

multiplying each Nth complex chip value in the series of complex chip values by a (N+K)th complex chip value in the series of complex chip values that is separated from the Nth complex chip value by a places to obtain a decoded sequence.

17. The method according to claim 16 wherein the step of determining a correct relative cyclical shift comprises the sub-step of:

performing a dot product operation between the decoded sequence and a reference code at a plurality of relative cyclical shifts to obtain a plurality of dot product values; and testing one or more inequality relations involving each of the plurality of dot product values in order to identify the correct cyclical shift that corresponds to a first dot product value from the plurality of dot product values that passes one or more inequality relations.

18. A spread spectrum transmitter comprising:

an N-bit parser receiving data to be transmitted to a receiver and outputting the data as one or more pursed bits;

a bit pattern encoder for receiving the one or more bits at an input and outputting a predetermined relative cyclical shift value in response to each possible bit pattern of the one or more bits at an output; and a cyclical shifter for receiving the relative cyclical shift value at an input and outputting a first spread spectrum code that has been shifted by the predetermined cyclical shift value at a cyclical shifter output.

19. The spread spectrum transmitter according to claim 18 further comprising:

a modulator including a first modulator input for receiving a first baseband signal including first spread spectrum code that has been shifted by the predetermined cyclical shift value.

20. The spread spectrum transmitter according to claim 19 further comprising:

a first pulse shaper for receiving the first spread spectrum code that has been shifted by the predetermined cyclical shift value at a first pulse shaper input that is coupled to the cyclical shifter output and outputting the first baseband signal based on the first spread spectrum code that has been shifted by the predetermined cyclical shift value at a first pulse shaper output that is coupled to the first modulator input 21. The spread spectrum transmitter according to claim 20 wherein the modulator further comprises:

a second modulator input for receiving a second baseband signal.

22. The spread spectrum transmitter according to claim 21 further comprising:

a second pulse shaper for outputting the second baseband at a second pulse shaper output that is coupled to the second modulator input, in response to receiving a second spread spectrum code at a second pulse shaper input; and a memory for storing the second spread spectrum code including a memory output coupled to the second pulse shaper input.

23. A spread spectrum transmitter comprising:

a processor programmed to:

read binary data that is to be transmitted to a receiver;

parse the binary data into a plurality of groups of N bits;

select a cyclical shift based on a bit pattern of each of the plurality of groups of N bits; and generate a cyclically shifted spread spectrum code by cyclically shift a first spread spectrum code by the cyclical shift.

24. The spread spectrum transmitter according to claim 23 wherein the processor is further programmed to:

generate a digital representation of a first baseband signal that includes the cyclically shifted spread spectrum code.

25. The spread spectrum transmitter according to claim 24 further comprising:

a first digital to analog converter coupled to the processor for receiving the digital representation of the first baseband signal and outputting a first analog baseband signal; and a modulator including a first input coupled to the first digital to analog converter for receiving the first analog baseband signal and modulating a carrier wave with the first analog baseband signal.

26. The spread spectrum transmitter according to claim 25 wherein the processor is programmed to:

generate a digital representation of a second baseband signal; and the transmitter further comprises;

a second digital to analog converter coupled to the processor for receiving the digital representation of the second baseband signal and outputting a second analog baseband signal; and the modulator includes:

a second input coupled to the second digital to analog converter for receiving the second analog baseband signal and modulating the carrier wave with the second analog baseband signal.

27. A spread spectrum receiver comprising;

a first correlator for determining a relative cyclical shift of a first received spread spectrum code; and a relative shift to bit pattern decoder for outputting one or more bits having a bit pattern based on the relative cyclical shift of the received spread spectrum code.

28. The spread spectrum receiver according to claim 27 further comprising;
   a second correlator for determining a relative cyclical shift of a second received spread spectrum code; and
   a time comparer for determining the relative cyclical shift of the first received spread spectrum code with reference to the relative cyclical shift of the second received spread spectrum code.

29. The spread spectrum receiver according to claim 28 further comprising:
   a quadrature phase shift key demodulator for demodulating a signal that includes the first received spread spectrum code and the second received spread spectrum code, and outputting a series of complex chip values at an in-phase output and a quadrature phase output.

30. The spread spectrum receiver according to claim 29 further comprising;
   a complex chip multiplier including:
      a first input coupled to the in-phase output, and a second input coupled to the quadrature-phase output for receiving the series of complex chip values and multiplying each Nth complex chip value in the series of complex chip values by a (N+K)th complex chip value in the series of complex chip values that is separated from the Nth complex chip value by a K places to obtain a decoded sequence to obtain a differentially decoded series.

31. The spread spectrum receiver according to claim 28 wherein the first correlator comprises:
   a shift register including:
      a first serial input for receiving the differentially decoded series; and
      a first parallel output;
   a first dot product operator including:
      a first parallel input coupled to the first parallel output;
      a second parallel input; and
      a first dot product operator output; and
   a reference first code memory including:
      an first memory output coupled to the second parallel input; and
   a first comparator including:
      a first input coupled to the first dot product operator output; and
      a second input;
      a threshold value source coupled to the second input; and
      a first comparator output.

32. The spread spectrum receiver according to claim 31 wherein the second correlator comprises:
   a shift register latch including a
      a second serial input for receiving the differentially decoded series;
      a second parallel output; and
      a control input coupled to the first comparator output; and
   a second dot product operator including:
      a third parallel input coupled to the second parallel output;
      a fourth parallel input; and
      a second dot product operator output; and
   a second reference code memory including:
      a second memory output; and
   a cyclical shifter including:
      a fifth parallel input coupled to the second parallel output; and
      a third parallel output coupled to the fourth parallel input; and
   a second comparator including;
      a first input coupled to the second dot product operator output;
      a second input coupled to a threshold value source; and
      a second comparator output.

33. The spread spectrum receiver according to claim 32 wherein the time comparer includes:
   a first input coupled to the first comparator output, and
   a second input coupled to the second comparator output.

34. A spread spectrum receiver comprising:
   a processor programmed to;
      determine a first relative cyclical shift of a first received cyclically shifted spread spectrum code; and
      output one or more bits having a bit pattern associated with the first relative cyclical shift.

35. The spread spectrum receiver according to claim 34 wherein the processor is programmed to:
   correlate the first received cyclically shifted spread spectrum code with a first reference code;
   correlate a second received spread spectrum code with the first reference code,
   determine the first relative cyclical shift relative to the second received spread spectrum code.

36. A computer readable medium containing programming instructions for operating a transmitter, the computer readable medium including programming instructions for:
   reading one or more bits to be transmitted to a receiver;
   determining a first cyclical shift based on a bit pattern of the one or more bits;
   obtaining a first direct sequence spread spectrum code characterized by the first cyclical shift; and
   transmitting the first direct sequence spread spectrum code.

37. A computer readable medium including programming instructions for operating a receiver, the computer readable medium including programming instructions for:
   receiving a signal that includes a first direct sequence spread spectrum code;
   determining a correct relative cyclical shift of the first direct sequence spread spectrum code; and
   outputting one or more bits having a bit pattern associated with the correct relative cyclical shift.

38. A communication system comprising:
   a transmitter including:
      a bit pattern encoder for receiving one or more bits at an input and outputting a predetermined relative cyclical shift value in response to each possible bit pattern of the one or more bits at an output;
      a cyclical shifter for receiving a relative cyclical shift value at an input and outputting a first spread spectrum code that has been shifted by the predetermined cyclical shift value at a cyclical shifter output; and
   a receiver including:
      a first correlator for determining the relative cyclical shift of the first spread spectrum code; and
      a relative shift to bit pattern decoder for outputting one or more bits having a bit pattern based on the relative cyclical shift of the received spread spectrum code.

* * * * *